June 23, 1936.  R. W. SELLMAN  2,045,028

RESILIENT VEHICLE BODY SUSPENSION MEANS

Filed March 26, 1934  2 Sheets-Sheet 1

INVENTOR.
Robert W. Sellman
BY
Myron J. Dikeman
ATTORNEY.

Patented June 23, 1936

2,045,028

UNITED STATES PATENT OFFICE 2,045,028

RESILIENT VEHICLE BODY SUSPENSION MEANS

Robert W. Sellman, Highland Park, Mich., assignor of one-fourth to Ben G. Fletcher, Wyandotte, Mich.

Application March 26, 1934, Serial No. 717,362

4 Claims. (Cl. 267—21)

The object of my invention is to produce a flexible suspension support means for mounting vehicle bodies on wheel supports.

Another object is to produce a resilient vehicle body suspension structure that will eliminate the body side support springs now commonly used in vehicle construction, yet provide a strong, flexible body support.

A further object is to produce a body suspension assembly that is resilient and flexible for eliminating all road shocks, yet sufficiently strong in structure to provide a stable body suspension.

A still further object is to provide a body suspension construction that will function to distribute the wheel shocks throughout the body section, and without causing a side displacement or tilting of the body section.

Another object is to produce a resilient vehicle body support, simple in construction, easily adapted to various types of wheel vehicles, efficient in operation and that can be manufactured at a very low cost.

These several objects are attained in the preferred form by the construction and arrangement of parts as are more specifically hereinafter set forth.

Similar parts on all drawings are marked by similar numerals or letters.

Figure 2:
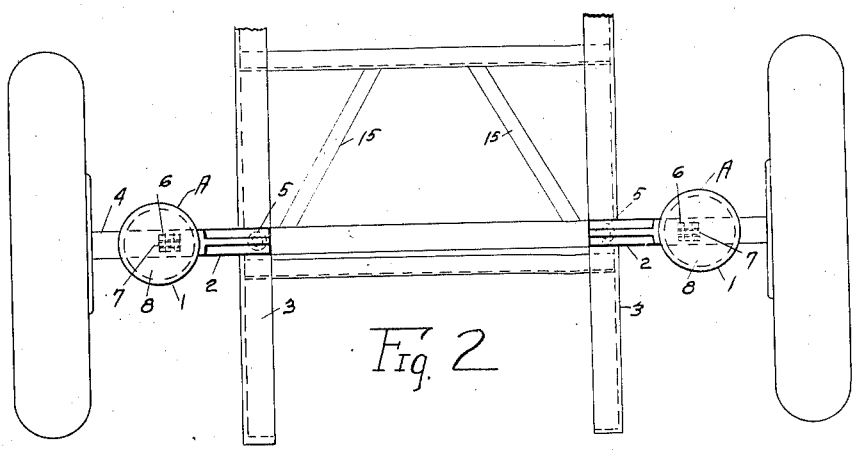
Fig. 2 is a top view of the same assembly as shown in Fig. 1 showing the general arrangement of the various supporting members.

The vehicle body suspension is adapted to aeroplane and automobile vehicle structures, as well as various other types of vehicles, but is herein illustrated as being applied to automobile construction, mounted on the front axle, although it is to be understood it is applicable to the rear axle as well and using the proper types of axle mountings.

In general, my invention comprises a pair of strong, rigid transverse suspension bars, arranged in X-shaped formation and in alignment with the vehicle axle, either at the front or rear of the vehicle or at both, the lower ends of said suspension bars being pivotally connected to the vehicle axle or housing, as the case may be, and with the upper suspension bar ends pivotally connected to the respective opposite sides of the vehicle body frame, one of said end connections for each suspension bar being made through a resilient suspension unit, of which several of the types applicable are herein illustrated.

I will now describe more fully the detailed construction of my device, referring to the drawings and the marks thereon.

The drawings herein shown are intended as illustrations of the general structure and application of my suspension means to any type of wheel vehicle, but without the detail structural design for a specific installation.

Figure 1:
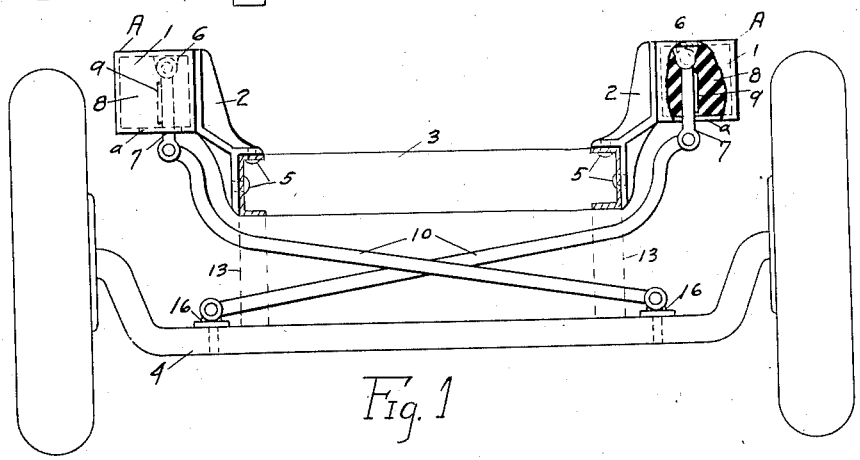
Fig. 1 is an elevation of a vehicle frame mounted on wheels showing one form of my suspension means, and the relative position of the operating parts for resiliently mounting the vehicle body frame on the wheel supports.
Figure 3:
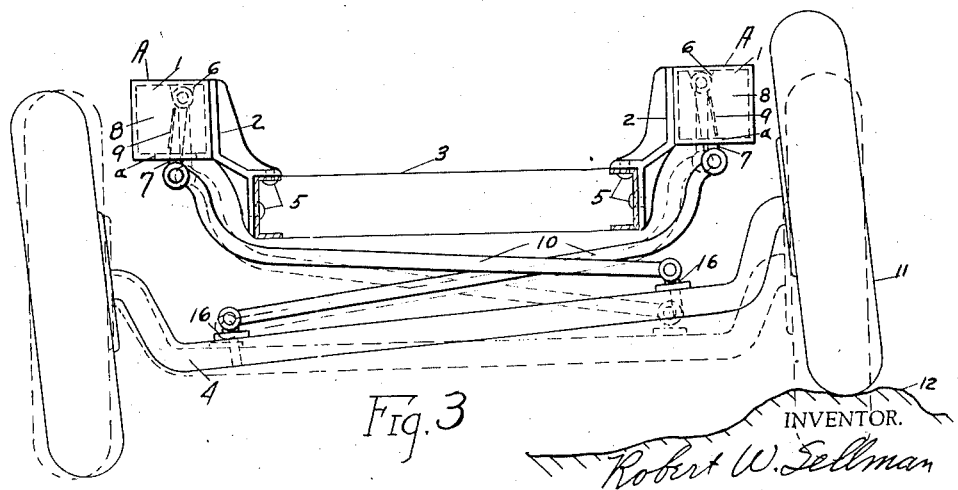
Fig. 3 is a front elevation of the same vehicle assembly as shown in Fig. 1, showing the modified position of the suspension members when one vehicle wheel is displaced by irregular road surfaces.

The preferred construction of the body suspension means is more specifically shown in Figs. 1 to 3 of the drawings, and having the resilient suspension units fixedly mounted on opposite sides of the body frame section, and with the transverse suspension bars connected to the movable member of the units.

The resilient suspension units A as here illustrated, are each formed of a hollow metal cylindrical casing 1, closed at both ends thereof, and provided with a strong, rigid mounting bracket 2 fixedly attached to the casing side or made integral therewith, suitable for fixedly and rigidly mounting the units on opposite sides of the vehicle body frame 3, said units being positioned directly above the vehicle axle 4, as illustrated in Fig. 2 of the drawings. The mounting brackets 2 may be attached to the frame by suitable bolt means 5, or by any other suitable means. Within the unit casing 1, at the top thereof is provided a rigid bearing 6, and carries pivotally mounted thereon a strong shackle link 7, moveable in alignment with the vehicle axle, said shackle link 7 being positioned in the casing near the mounting bracket side and is extended through the casing wall slot opening $a$ formed through the lower casing end wall, said casing slot also being in alignment with the vehicle axle. The suspension unit casing 1 is filled with some strong, durable resilient, elastic material, preferably rubber section 8, or like material, and for heavy types of vehicles, a pressure plate 9 may be added to the outer side of the shackle links 7 for increasing the pressure surface against the rubber section 8. To the lower ends of the shackle links 7 are pivotally attached the rigid transverse suspension bars 10, each being curved sufficiently to prevent contact with the body frame 3 and extended in alignment with the vehicle axle to the opposite vehicle side, and pivotally attached to said axle or housing 4 by suitable pivot bearings 16 fixedly and rigidly attached thereto, the pair of suspension bars 10 forming an X shaped suspension frame assembly for the vehicle body frame. The vehicle body weight resting on the resilient suspension units A, tend to spread the shackle links 7 against the resisting resilient casing material 8, and reacts as a spring or cushion support for the body frame 3, and in a similar manner to the ordinary side support springs now commonly used in vehicle construction. With this type of resilient body suspension means, any wheel shock as may result from road travel over irregular road surfaces, is absorbed within the resilient suspension unit A, and without affecting the vehicle body section. The Fig. 3 of the drawings illustrates one vehicle wheel 11 as raised by contact with a road obstacle 12. The wheel displacement being vertical and the suspension unit connection being on the opposite side of the vehicle body, very little of the resulting displacement, or the shock is transferred to the body frame 3, allowing the vehicle body to travel with very little resulting displacement even though the road travel may be irregular and rough. In cases where the side support springs 13, indicated by the dotted lines of Fig. 1, are omitted in the present common automobile structure, and which are now utilized as the axle connecting means, other axle support members for connecting the axle to the body frame, such as arms 15 shown in the Fig. 2, may be used, or any other suitable means.

In actual construction of my body suspension means, any suitable form or type of pivot joint may be used, such as hinge joints, or ball and socket joint structures, and applied at either end of the suspension bars 10, and where desirable such joint structures may be rubber lined to prevent noise or shock.

Figure 4:
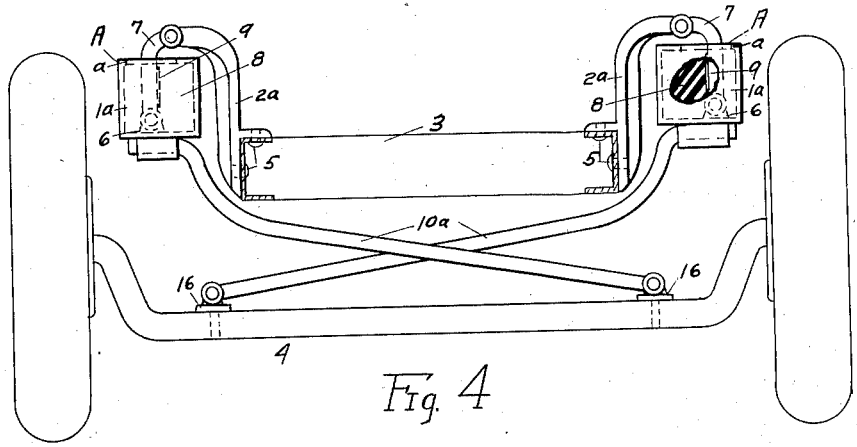
Fig. 4 is another elevation of the front assembly of a vehicle frame mounted on wheels, showing a modified form of the resilient suspension unit as mounted on the opposite vehicle body frame sides.

The Fig. 4 of the drawings illustrates a modified arrangement of the resilient suspension units A, the unit casings 1a being of exactly the same structure and formation as the casing 1 of the previously described units, except said casing 1a is inverted in position, and fixedly and rigidly attached to the upper end of the respective suspension bars 10a instead of the mounting bracket 2 as in the former case, and with the shackle link 7 pivotally attached to the body frame mounting bracket 2a as illustrated in the Fig. 4. The remaining construction and its operation is the same as in the previously described case.

Figure 5:
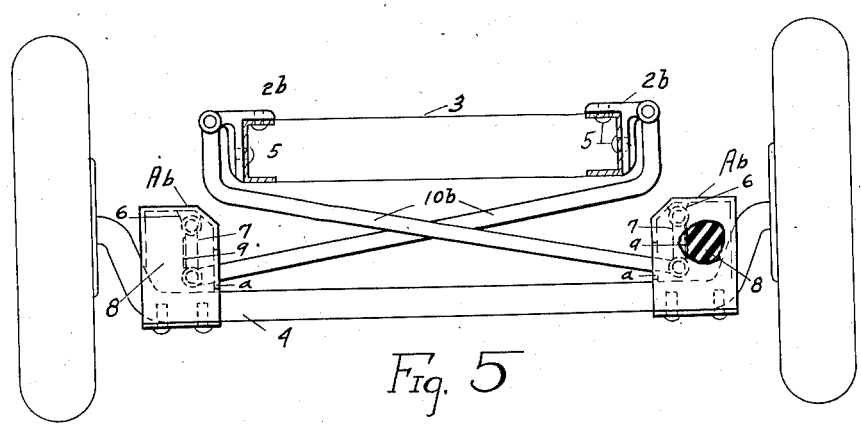
Fig. 5 is also a front view of a similar vehicle assembly, showing a further modification of my suspension means where the resilient suspension units are mounted on the vehicle axle instead of the body frame section.

A further modification is illustrated in the Fig. 5 of the drawings, showing similarly constructed suspension units Ab, having like casing, shackle link and rubber filler as in the former cases, but assembled with said suspension units fixedly mounted on the vehicle axle instead of the body frame previously shown, and with the respective transverse suspension bars 10b pivotally mounted at the upper ends thereof to the frame 3 by pivot bearing brackets 2b fixedly attached to the frame, said suspension bars having their lower ends pivotally connected to the respective shackle links 7 as illustrated in the drawings. This structure being similar to the former case except the resilient suspension units Ab are mounted at the opposite ends of the suspension bar units, and in cases where desired such resilient extension unit, or any spring extension unit, could be mounted in the center of the suspension bar section, as illustrated in the spring unit x of Fig. 8. The operation of the suspension herein described is the same as in the previous cases.

Figure 6:
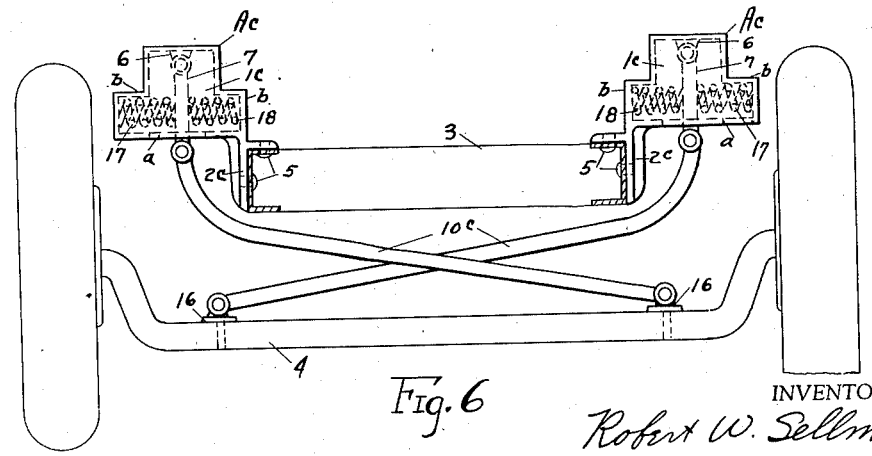
Fig. 6 is another elevation of the vehicle frame and support wheels showing an alternate structure for the resilient suspension units, actuated by heavy coil springs.

The Fig. 6 of the drawings shows a substitute resilient suspension unit Ac as mounted on opposite body frame sides. In this case the rubber filling 8 of the casing 1 previously described, is omitted, and the casing 1c being modified in form by added side cups b designed to receive heavy resisting coil springs 17 and 18 therein, the coil spring 17 being the stronger spring and of sufficient strength to resist vertical displacement of the assembled body suspension unit under normal vehicle body load. The suspension unit Ac is fixedly attached to the body frame 3 by the mounting bracket 2c integral therewith as in the former case, and the suspension bars 10c connected to the respective shackle links 7 accordingly. The remaining construction and operation of the suspension unit is the same as for the Fig. 1 previously described.

It is apparent that my invention is subject to various modifications in types of resilient suspension units as well as mechanical design and arrangement of the operating parts, and without departing from the spirit of my invention, and I claim not only the structures herein illustrated, but any modification thereof that is substantially a substitution of parts herein shown.

Having fully described my resilient vehicle body suspension means, what I claim as my invention and desire to secure by Letters Patent is:

I claim:

1. A resilient suspension device adapted for mounting vehicle bodies on wheel vehicles and used in combination therewith, comprising a suspension unit having a pivoted support link with resilient restraining side members therein, mounted on opposite sides of the vehicle body above the vehicle axle, a pair of transverse suspension bars mounted between said vehicle body and axle, said suspension bars having their upper ends connected each to the pivoted link of one of said suspension units, and with their respective lower ends pivotally connected each to the opposite axle end.

2. A resilient suspension unit adapted for mounting a vehicle body on wheel supports and used in combination therewith, comprising a suspension unit rigidly mounted on opposite sides of the vehicle body, said suspension units having a link support member pivotally mounted therein and provided with resilient side restraining means, a pair of transverse suspension bars arranged in a vertical plane in X-shaped formation, mounted between the vehicle body and axle sections, said suspension bars having their respective upper ends connected each to a link support member of one of said body suspension units, and with their lower ends pivotally connected each to the opposite axle end.

3. A resilient body suspension assembly adapted for mounting vehicle bodies on wheel supports and used in combination therewith, comprising a body suspension unit rigidly mounted on opposite sides of a vehicle body frame above the vehicle axle, said suspension units each being formed of a hollow casing member having a vertically positioned link support member pivotally mounted therein, resilient flexible resisting means mounted between the said casing walls and the pivoted link support member, a pair of transverse suspension bars arranged in X-shaped formation positioned between the vehicle body and axle, and having their respective upper ends pivotally connected to the free ends of the suspension unit link support member, and with the lower rod ends pivotally connected each to the opposite axle end.

4. A resilient body suspension means adapted for mounting a vehicle body on wheel supports and used in combination therewith, comprising a resilient suspension unit rigidly mounted on opposite sides of a vehicle body above the axle section, each of said resilient suspension units being formed of a casing member suitable for rigidly attaching to the vehicle body, and having a suspension link member pivotally mounted therein at one end thereof said casing being partially filled with a resilient rubber material surrounding said link support, a pair of transverse suspension bars positioned in a vertical plane in an X-shaped formation mounted between the vehicle body and axle sections, said suspension bars having their respective upper ends pivotally connected to the free ends of the resilient suspension unit link, and with the lower bar ends pivotally connected each to the opposite axle end.

ROBERT W. SELLMAN.